E. G. BUSSE.
BRAKE BEAM.
APPLICATION FILED MAR. 2, 1916.
1,181,290.
Patented May 2, 1916.
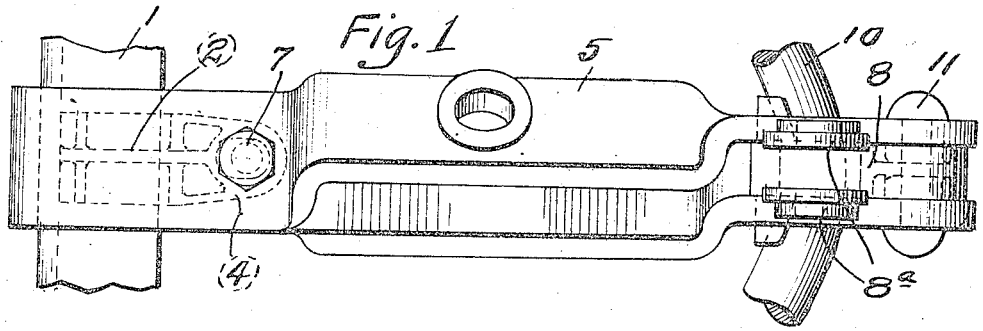
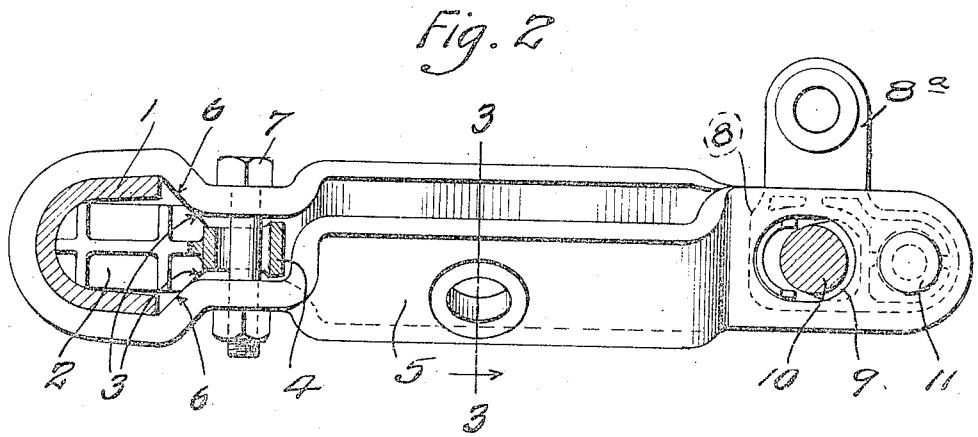
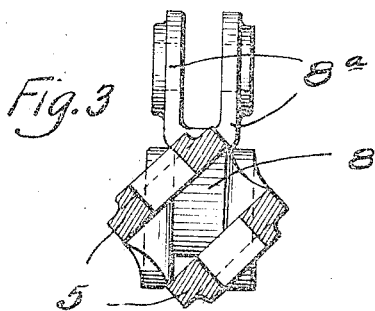
Inventor
Edwin G. Busse
By ____, Atty.

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

1,181,290.  Specification of Letters Patent.  Patented May 2, 1916.

Application filed March 2, 1916. Serial No. 81,859.

*To all whom it may concern:*

Be it known that I, EDWIN G. BUSSE, a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a top plan view of my improved brake beam. Fig. 2 is a side elevational view showing the strut thereof. Fig. 3 is a sectional view through the strut on line 3—3 of Fig. 2.

This invention relates to a new and useful improvement in brake beams and particularly the strut thereof.

Heretofore it has been the practice to employ a wedge key to tighten the strut on the compression member and it is one of the objects of my invention to utilize a filler block which will dispense with the wedge key.

It is also an object of my invention to increase the length of the brake lever slot as will hereinafter appear.

In the drawings 1 indicates the U-shaped compression member of a brake beam and 2 is the filler block seated therein and extending outwardly therebeyond, said filler block having inclined faces 3, the forward extension 4 having an elongated opening.

5 is the strut which is bent into shape to embrace the compression member 1, said strut having inclined faces 6 in advance of the compression member for engagement with the inclined faces 3 of the filler block. A bolt 7 passes through the strut and the elongated opening in the forward extension 4 of the filler block and when this bolt is tightened the members of the strut are brought together, the filler block is forced into the compression member and all of the parts including the strut, the compression member, and the filler block are clamped tightly in position by the bolt 7. It will be noted that the filler block is free from the legs of the compression member and that the elongated opening in the forward extension thereof, through which the bolt 7 passes, permits a limited freedom of movement of the filler block which enables it to find its seat in the final clamping adjustment of the parts. The forward free ends of the strut also contain a filler block 8, said ends being formed with elongated openings 9 for the passage of the tension member 10. It has heretofore been the practice to rivet the free ends of the strut inside the tension member, but I propose, in my present construction, to extend the free ends of the tension member, and the filler block, outwardly beyond the tension member so as to enable the location of a rivet 11 in such outward extension. In this way I am enabled to obtain a long lever slot. The filler block 8 may have an upward extension 8ª for a third suspending link, or it may have outwardly and downwardly extensions for third point supports.

What I claim is:

1. A brake beam comprising a compression member open at one side, a filler block arranged therein and having anticlinal faces, a strut embracing said compression member and having oppositely inclined faces to engage said filler block, and means for forcing the opposite sides of said strut into clamping engagement with said filler block and said means permitting the free movement of said filler block to its final position.

2. A brake beam strut comprising two members provided with openings for the passage of the tension member, a filler block between said members, and securing means located outside of the tension member openings for holding the parts of the strut to the filler block.

In testimony whereof I hereunto affix my signature in the presence of two witnesses, this 24th day of February, 1916.

EDWIN G. BUSSE.

Witnesses:
EDWARD T. WALKER,
MARGARET E. LYNCH.